UNITED STATES PATENT OFFICE.

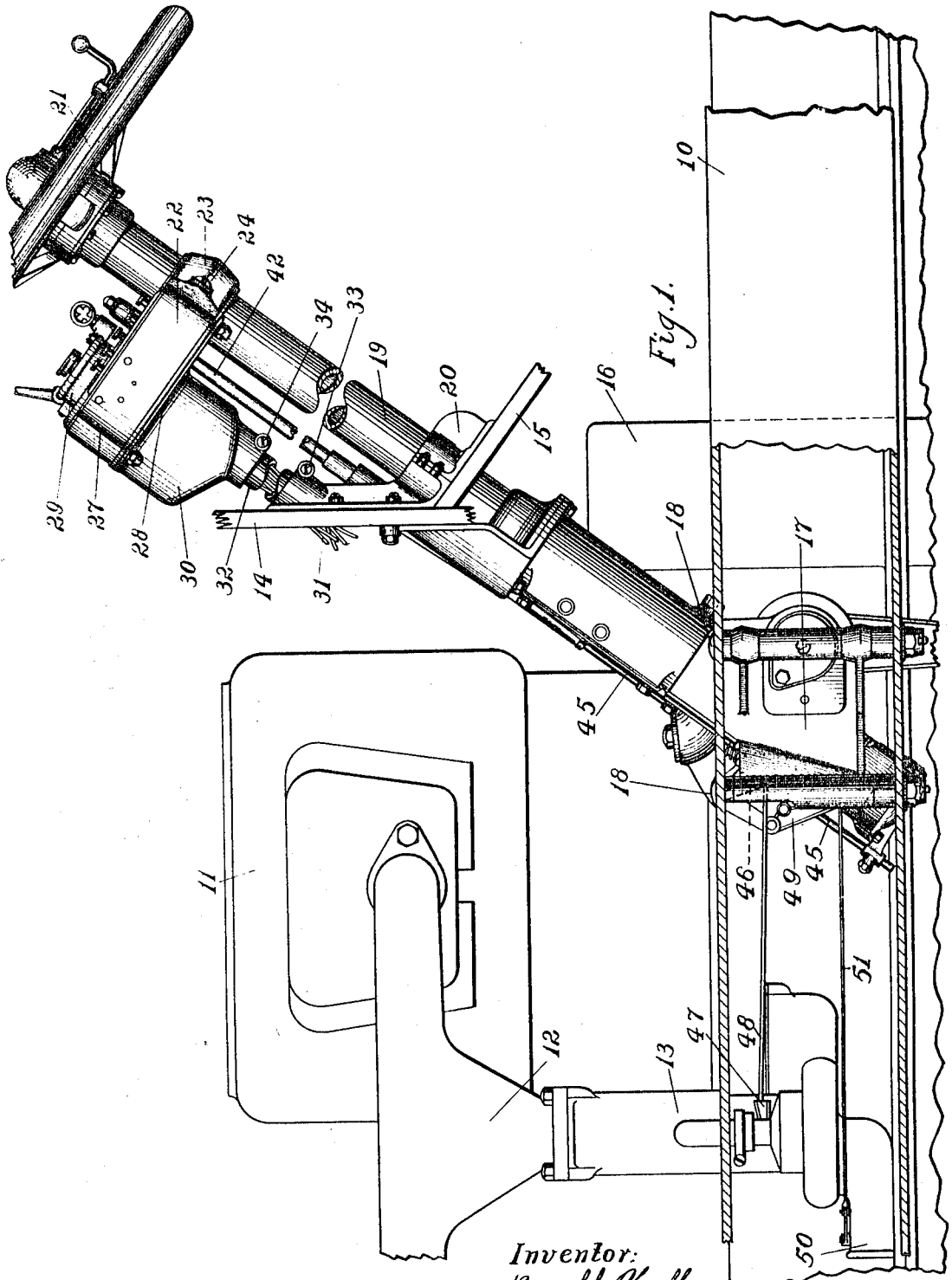

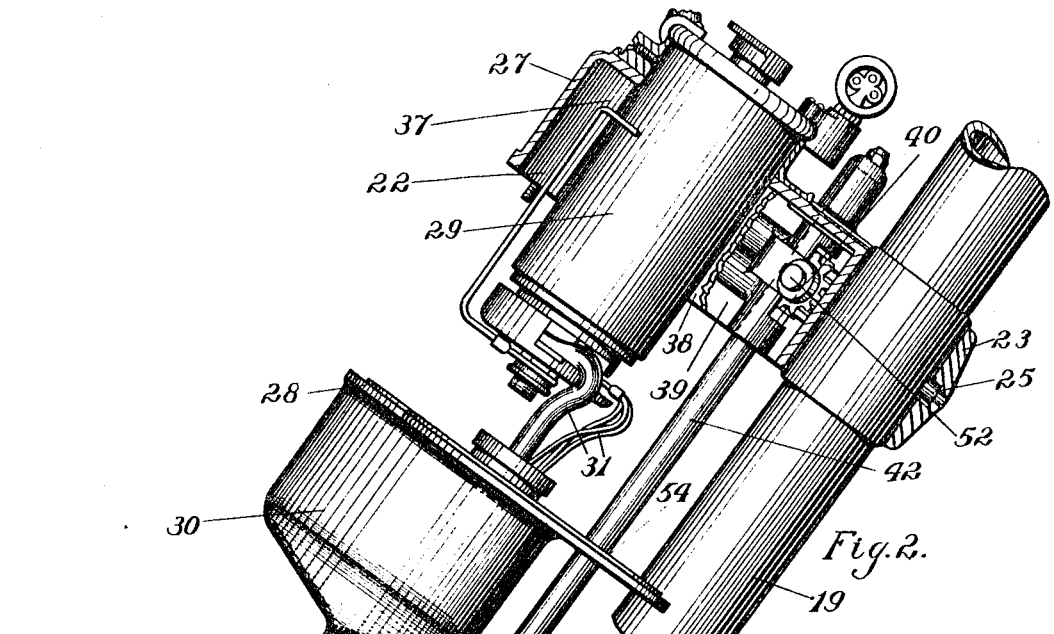
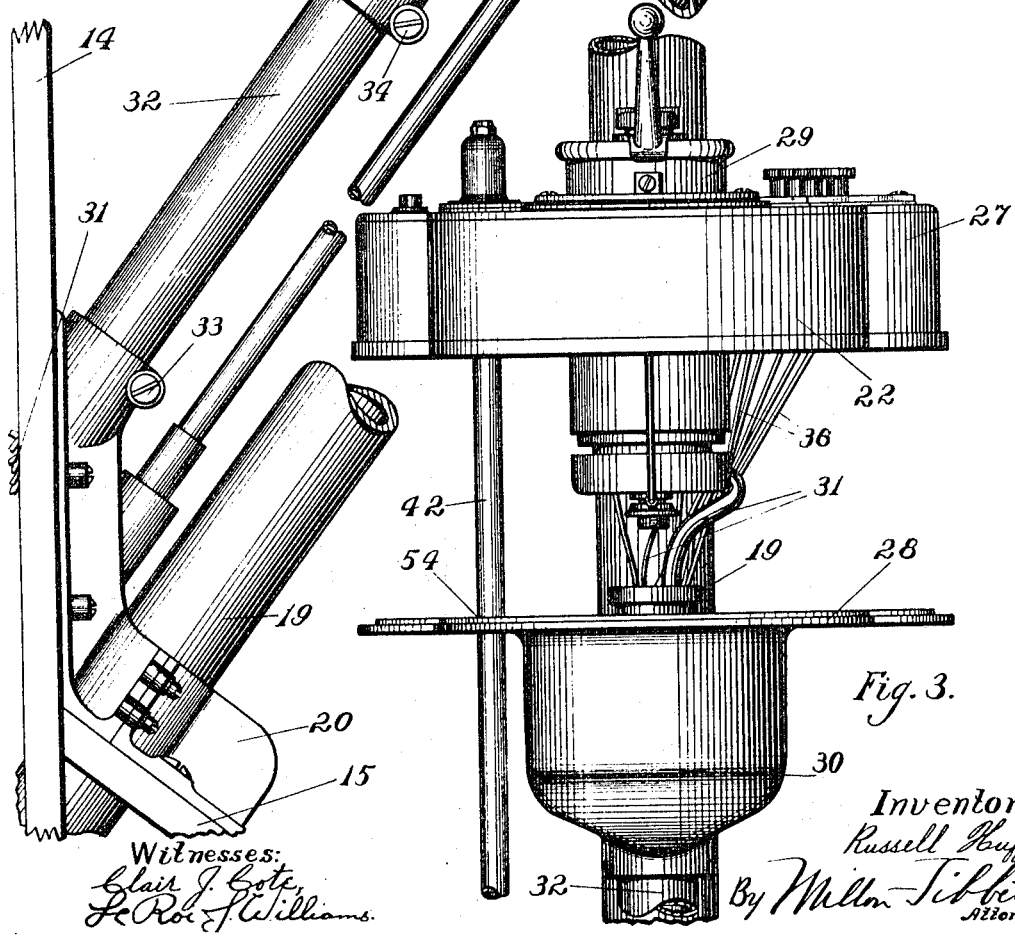

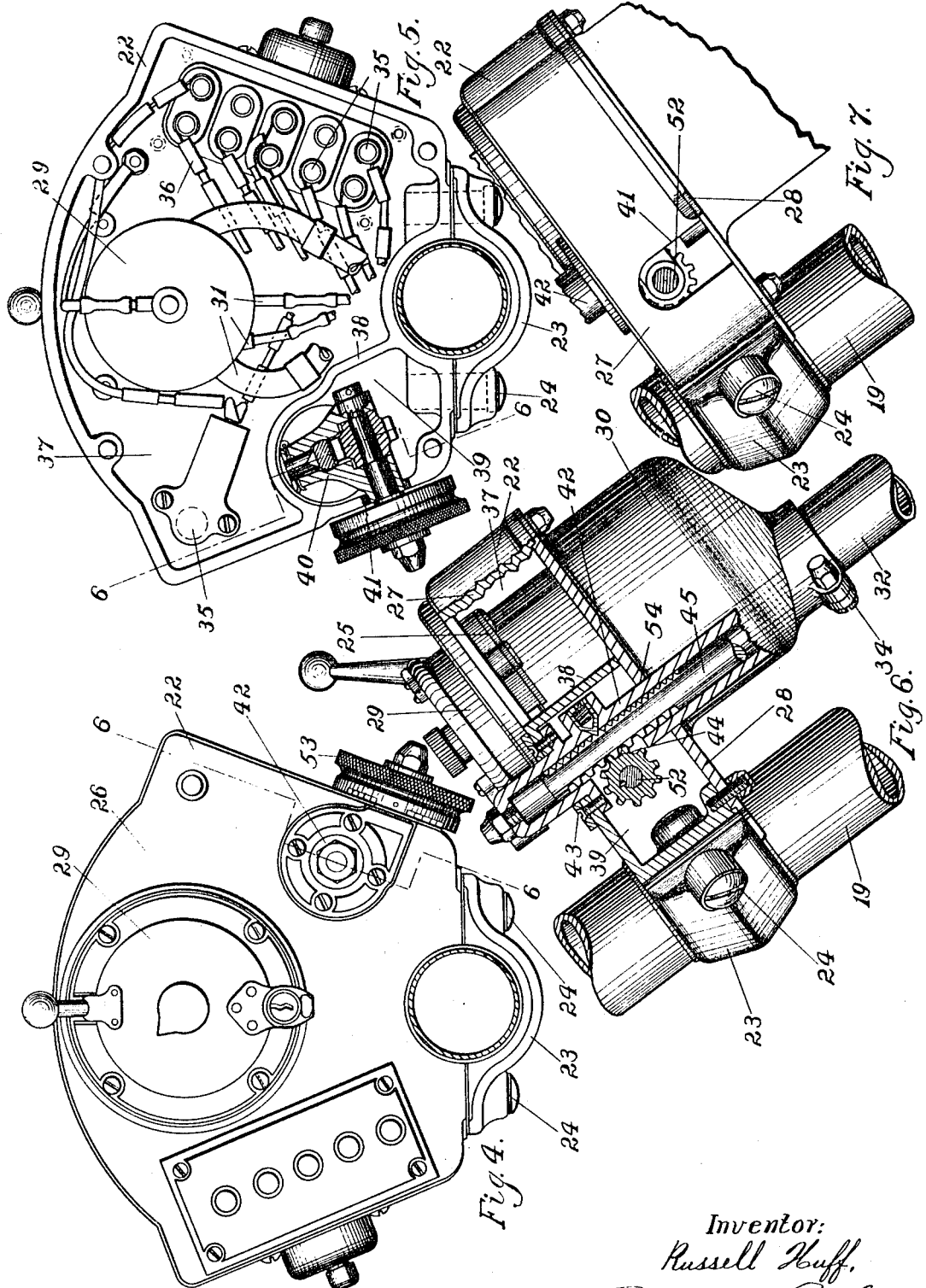

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

CONTROL DEVICE.

1,270,828.

Specification of Letters Patent.

Patented July 2, 1918.

Application filed August 22, 1913. Serial No. 786,193.

*To all whom it may concern:*

Be it known that I, RUSSELL HUFF, a citizen of the United States, and resident of Detroit, Wayne county, State of Michigan, have invented certain new and useful Improvements in Control Devices, of which the following is a specification.

This invention relates to motor vehicles, and particularly to the control devices thereof and the means for mounting them.

One of the objects of the present invention is to provide what may be termed a "control board" adapted to support and house the control devices of a motor vehicle conveniently for the operator of the vehicle and accessible for inspection and repair.

Another object of the invention is to provide a novel means for mounting such control board upon the steering column of a vehicle with suitable housings for the various connections between the control board and other parts of the vehicle.

Another object of the invention is to provide such control board with suitable compartments for the electrical and mechanical control devices which it supports.

Other objects of the invention will appear from the following description, taken in connection with the drawings which form a part of this specification, and in which, Figure 1 is a side elevation and part sectional view of the forward part of a motor vehicle embodying the invention;

Fig. 2 is an enlarged side elevation and part sectional view of the control board or casing shown in Fig. 1, with the casing cover dropped for inspection of the control devices;

Fig. 3 is a front view of the control board as shown in Fig. 1;

Fig. 4 is a view looking down on the face of the control board, showing the steering column in section;

Fig. 5 is an underneath view of the control board with the cover removed and showing the mechanical control device of the carbureter in section;

Fig. 6 is a section approximately on lines 6—6 of Figs. 4 and 5; and

Fig. 7 is a right side view of the control board with part of the carbureter control device cut away.

Referring to the drawings, 10 represents the forward part of the motor vehicle frame upon which is mounted the motor 11 having an intake pipe 12 and carbureter 13. The motor vehicle dash 14 and floor board 15 are also suitably supported upon the frame 10 approximately over the fly wheel 16 of the motor.

Also supported upon and secured to the frame 10 is the steering gear 17, as by bolts 18, and the steering column 19 extends diagonally upward from the steering gear 17 through the floor board 15 and through a bracket 20 which secures the floor board 15 to the dash 14, as shown particularly in Figs. 1 and 2. At the upper end of the steering column 19 is the steering wheel 21, which is suitably connected with the steering gear by a shaft passing through the column 19 in any well known manner. The steering column 19 is therefore stationary and adapted to support what may be termed a "control board", which is shown in the form of a casing 22 secured adjacent the upper end of the steering column 19 by means of a strap 23 and bolts 24. As shown in Fig. 2, a dowel pin 25 extends from the steering column into the strap 23 to prevent the strap and casing from turning relative to the steering column.

The casing 22 is shown as having a top face 26 and integral sides 27. It is open underneath and provided with a removable cover 28 which is thereby adapted to form an approximately tight housing for the various control devices hereinafter described.

A coil and switch device 29 is secured to the face 26 of the casing and extends through the casing, as shown in Fig. 2, and into an enlargement 30 formed in the cover 28. This coil and switch device forms a part of the ignition system of the motor, and it is connected with the motor through various high and low tension wires, indicated at 31. These wires pass to the motor through a housing or tube 32 which has its lower end passing through and secured to the bracket 20, hereinabove described, a clamping screw 33 being provided for securing the tube in place. The upper end of the tube 32 passes through an opening in the base of the enlargement 30 in the cover 28, and when the cover is secured in place on the casing 22 it is clamped to the upper end of the tube 32, as by the screw 34. It will be seen that the cover 28 may be dropped to the position shown in Fig. 2 by sliding it down on the tube 32 so that the interior of the casing 22 may be inspected and parts removed for repair.

Also supported in the casing 22 are electric switches 35 with wires 36 extending therefrom through the tube 32 to the lights and other electrical devices of the vehicle.

It will be seen that the coil and switch device 29 and the switches 35 are all contained in a compartment 37 of the casing 22, which compartment is separated by a wall 38 from another compartment 39 formed in one corner of the casing 22. This latter compartment is adapted to house a mechanical control device 40 which is connected to the air valves of the carbureter. The particular form of this device forms no part of the present invention, but it will be described briefly, merely to make its operation plain.

The side 27 of the casing is cut away, as shown at 41 in Figs. 5 and 7, and a tubular support 42 is secured to the casing 22, as by the screws 43, and is provided with a rack-and-pinion mechanism 44 operating on a rod 45 which extends through the tube 42 parallel with the steering column 19 through the bracket 20 to the lower end of the steering gear 17. The lower end of this rod 45 is shown in Fig. 1 as connected to a bell crank lever 46 which controls a wedge 47 through a connecting rod 48. It will be understood also that the rod 45 likewise operates upon a bell crank lever 49 which is connected to a shutter in the main air intake 50 of the carbureter through a connecting rod 51. Thus the air valves of the carbureter are adjusted or controlled through the rack-and-pinion mechanism 44 in the compartment 39. The pinion of said mechanism is mounted on a shaft 52 which extends through the opening or slot 41 and has a hand wheel 53 mounted thereon outside of the casing 22 so that the rack-and-pinion mechanism may be manually operated. It will be seen that the cover 28 has an opening 54 through which the tubular support 42 passes and the cover slides on this tube also as it is dropped to expose the interior of the casing. It will also be observed that the partition 38 makes the compartment 37 independent of the compartment 39 so that any moisture that may get into the compartment 39 through the slot 41 will be prevented from interfering with insulation of the electrical devices in the compartment 37.

The arrangement of the cover 28 underneath the casing 22 and in such position that it may be dropped to expose the interior of the casing without in any way interfering with the control devices therein or with the attachment of the casing to its support, is a distinct advantage in a control board of this character. The construction is particularly well adapted to support, house and protect the control devices and it is at the same time well designed for inexpensive manufacture.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:

1. In a motor vehicle, the combination with the control devices, of a casing therefor non-rotatably mounted upon the steering column and said casing having a cover secured thereto independently of the steering column.

2. In a motor vehicle, the combination with the control devices, of a stationary casing therefor mounted upon the steering column said casing having a stationary cylindrical extension into which said control devices extend, and a stationary tube extending from said cylindrical extension to the motor compartment of the vehicle.

3. In a motor vehicle, the combination with the control devices, of a casing therefor mounted upon the steering column and having an underneath cover secured to the casing independently of the steering column, said control devices having connections extending through said cover.

4. In a motor vehicle, the combination with the steering column, of a tube extending upwardly substantially parallel with the steering column, and a casing mounted on the steering column adjacent its upper end and having an underneath cover secured to it independently of the steering column, said tube extending into said cover, and said cover being slidable on said tube to open the casing.

5. In a motor vehicle, the combination with the control devices, of a casing therefor mounted on the steering column adjacent its upper end, a tube extending upwardly substantially parallel with the steering column, and an underneath cover secured to said casing independently of the steering column, said cover being slidable on said tube to open said casing and expose the control devices.

6. In a motor vehicle, the combination with the control devices, of a stationary casing therefor mounted on the steering column adjacent its upper end, a bracket at the lower end of the steering column and a stationary tube extending upwardly from said bracket parallel with the steering column into the under side of said casing, said control devices extending downwardly from said casing through said tube.

7. In a motor vehicle, the combination with the control devices, of a stationary casing therefor mounted on the steering column adjacent its upper end, a bracket at the lower end of the steering column, a stationary tube extending upwardly from said bracket substantially parallel with the steering column, into the underside of said casing, said control devices extending downwardly through said tube and a removable cover for said casing sliding on said tube.

8. In a motor vehicle, the combination with the electrical and mechanical control devices, of a support, and a control board mounted on said support and comprising a casing for said control devices said casing having a plurality of compartments, the electrical control devices being in one of said compartments and the mechanical control devices being in the other of said compartments.

9. In a motor vehicle, the combination with the electrical and mechanical control devices, of a support, a control board mounted on said support and comprising a casing for said control devices said casing having a plurality of compartments, the electrical control devices being in one of said compartments and the mechanical control devices being in the other of said compartments, and a cover for said control board common to both said compartments.

10. In a motor vehicle, the combination with the control devices, of a support, a casing for said devices mounted on said support and having an underneath cover, connections from said devices extending through the underneath part of the casing, said cover being adapted to be detached from the casing without moving said connections or devices.

11. In a motor vehicle, the combination with the control devices, of a support, a control board comprising a casing for said control devices said casing having an opening, a tube extending from said casing to said support, the control devices extending through said tube and a cover for said opening slidable on said tube and detachably connected with said casing.

12. In a motor vehicle, the combination with the control devices, of a support, a control board comprising a casing for said control devices, said casing having an opening, a tube extending from said casing to said support, the control devices extending through said tube and a cover for said opening slidable on said tube and detachably connected with said casing, said connection being independent of said control devices.

13. In a motor vehicle, the combination with the electrical and mechanical control devices, of a support and a control board mounted on said support, and comprising a closed-in compartment for said electrical devices and a part adapted to mount said mechanical devices.

In testimony whereof I affix my signature in the presence of two witnesses.

RUSSELL HUFF.

Witnesses:
J. F. B. KNAP,
LE ROI J. WILLIAMS.